United States Patent Office 3,435,076
Patented Mar. 25, 1969

3,435,076
TRICYCLIC PHOSPHINES AND THE PREPARATION THEREOF
Ronald F. Mason, Mill Valley, Calif., assignor to Shell Oil Company, New York, N.Y., a corporation of Delaware
No Drawing. Filed July 19, 1966, Ser. No. 566,243
Int. Cl. C07f 9/28, 9/02
U.S. Cl. 260—606.5     10 Claims This invention relates to certain tricyclic phosphines and their preparation. More particularly, it relates to a novel class of tricyclic heterocyclic tert-phosphines.

PRIOR ART

To applicant's knowledge, tricyclic heterocyclic tert-phosphines of this type have not heretofore been prepared. An unsuccessful attempt to produce a certain substituted tricyclic phosphine has been reported. R. L. Letsinger et al., J. Org. Chem., 23, 1806 (1958) have disclosed that the intramolecular cyclization of tris(o-methoxymethylphenyl)phosphine or tris(o-chloromethylphenyl)phosphine in no case yielded the tricyclic phosphine, 2,3,5,6-dibenzo-1,4,7-trihydrophosphapyrene.

THE INVENTION

It is an object of the present invention to provide a novel class of phosphorus-containing tricyclic organic compounds. A more particular object is to provide novel monophosphatricycloalkanes in which ring system (a) the tricycloalkanes are tricyclotridecanes and (b) the phosphorus atom is a member of each of the three ring systems.

It has now been found that these objects are accomplished by the reaction of phosphine ($PH_3$) with a suitable carbocyclic nonconjugated triolefinic hydrocarbon, such as a hydrocarbon having the 1,5,9-cyclododecatriene nucleus, whereby the desired ring system is provided directly in one step.

The novel compounds of the invention are tricyclic heterocyclic tert-phosphines. They are hydrocarbyl-substituted or unsubstituted monophosphatricyclotridecanes in which the smallest phosphorus-containing ring contains at least 5 atoms and the largest no more than 7 atoms, and the phosphorus atom is a member of each of the three rings. The ring carbons may be substituted; however, it is preferred that such C-substituents be limited to non-bulky ones such as lower alkyl of from 1 to 4 carbons, more especially methyl.

REACTANTS

The tricyclic compounds of the invention are produced by reacting phosphine ($PH_3$) with suitable cyclic triolefinic compounds under free radical-generating conditions and in the absence of substantial amounts of oxygen. In the preferred one-step method, the aforesaid tricyclic compounds are produced by reacting a cyclic hydrocarbon containing three ring nonconjugated double bonds, preferably in 1,5 relationships, with phosphine under free radical-generating conditions and in the absence of substantial amounts of oxygen. Preferred cyclic trienes useful in the practice of this process include cyclic trienes which are cyclooligomers of conjugated acyclic diolefins of 4 to 6 carbons, e.g. trans,trans,cis-1,5,9-cyclododecatriene; trans,trans,trans-1,5,9-cyclododecatriene; 1,5,9-trimethyl-trans,trans,cis - 1,5,9 - cyclododecatriene; 1,5,9-trimethyl-trans,trans,trans-1,5,9-cyclododecatriene; 3,7,11-trimethyl-trans,trans,cis-1,5,9-cyclododecatriene; 3,7,11 - trimethyl-trans,trans,trans - 1,5,9 - cyclododecatriene; isomeric mixtures thereof; and the like.

CATALYST

The cyclization reaction is carried out under free radical-generating conditions. The term "free radical-generating conditions" is meant to include the presence of a free radical-generating catalyst, such as an azonitrile, or a dialkyl or diacyl peroxide; actinic radiation, particularly ultraviolet light; and high energy or ionizing radiation, such as from α-rays, β-rays, γ-rays, X-rays deuterons, protons, and neutrons.

The azonitrile catalysts which may be employed in this reaction are well known in the art and include α,α'-azobisisobutyronitrile; α,α'-azobis(α-methylbutyronitrile); α,α'-azobis(α-methylisocapronitrile) and the like. Suitable peroxide catalysts include the dialkyl peroxides such as di(tert-butyl) peroxide, and the diacyl peroxides such as butyryl, lauroyl, and benzoyl peroxides. The amount of catalyst which may be used may vary over a wide range from 0.1% by weight upward. From 0.5 to 5% by weight of catalyst, based on the weight of phosphine reactant, is ordinarily desirable.

A preferred free radical-generating system is a suitable ionizing radiation, for example, that supplied by cobalt-60. A dose rate between about $1 \times 10^3$ and $1 \times 10^7$ rads./hr. of ionizing radiation in the form of fast electrons or electromagnetic radiation with photons in the energy range of $1 \times 10^4$ to $1 \times 10^7$ electron-volts will supply the appropriate free radical-generating conditions for the process of the invention. A preferred operating range is from $1 \times 10^4$ to $1 \times 10^6$ rads./hr. of ionizing radiation in the form of electromagnetic radiation with incident photon energy of about $1 \times 10^6$ electron-volts.

Sources of ionizing radiation include electrical devices such as cathode tubes, which produce electrons, and various accelerators, such as cyclotrons, synchrotrons, betatrons, which produce electrons, protons, deuterons, and α particles. The natural and artificial radioactive elements can also be used as sources of radiation. The radioactive isotopes of radium, thorium, bismuth, palladium, cobalt, phosphorus, strontium, and the like can be used as a source of rays. Spent fuel elements can also be used as radiation sources, particularly since they are a low cost source of ionizing radiation. Still another source of ionizing radiation is the highly energetic fragments which result at the moment of fission.

REACTION CONDITIONS

The two reactants may be used in equimolecular amounts or in a slight molar excess of one reactant or the other. In a preferred mode of operation the reactants are used in equimolar quantities to maximize the cyclization. The reaction may be conducted in the presence of a nonreactive solvent medium such as aliphatic cyclic and acyclic saturated hydrocarbons, e.g. pentane, n-hexane, cyclohexane, petroleum ether, isooctane, and the like. It is sometimes desirable to conduct the cyclization in the presence of one of the aforesaid solvents in order to dilute the reactants, thereby maximizing cyclization and minimizing polymerization. Such solvents also aid in dissipating the heat generated in this exothermic reaction.

The mixture and its environment should be free of substances, such as oxygen and air, capable of converting the desired tricyclic heterocycle phosphines to the corresponding compounds of a higher oxidation state, e.g. phosphine oxides. Hence, the reaction should be conducted in an inert atmosphere such as under nitrogen or under vacuum. If desired, small amounts of oxidative inhibitors may be added.

The temperature at which the reaction should be conducted will be governed by the specific free radical-generating conditions utilized therein, in that a useful temperature is one at which the free radicals are furnished at a moderately even rate throughout the course of the reaction. For example, when the free radical-generating condition is obtained by means of ionizing radiation ambient room temperature is sufficient; although reaction may be speeded by operating at higher temperatures, i.e., preferably from about 125° to 140° C. When α,α'-azobisisobutyronitrile is the source of free radicals, a temperature of about 70° C., conveniently obtained by conducting the reaction in refluxing n-hexane, is sufficient. On the other hand, when the free radicals are obtained from a dialkyl peroxide, temperatures of 110–150° C. will be desired in order to decompose smoothly the peroxide. The cyclization may be carried out at any temperature short of the rapid decomposition point of any of the free radical-generating agents used. The lower temperature limit is that at which the condensation becomes impractically slow. Temperatures from 15° C. (room temperature) to 200° C. may be used, the preferred range ordinarily being from about 70° C. to about 175° C. The reaction will usually be carried out at above atmospheric pressure, although higher or lower pressures may be used, with due consideration given to the physical properties of the reactants, e.g., volatility and the like.

A number of substituted and unsubstituted monophosphatricyclotridecanes (perhydrophosphaphenalenes) can be produced according to the invention, having one of two basic ring systems. In the nomenclature of the compounds, conventional numbering of the ring systems has been employed, as further illustrated by the following formulas:

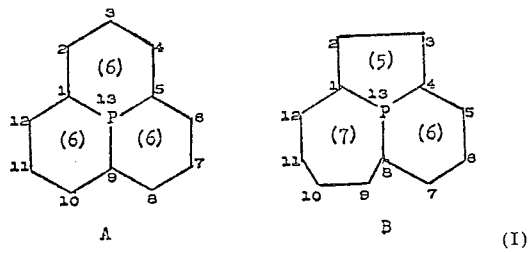

Typical substituted and unsubstituted 13-phosphatricyclotridecanes I–A and I–B of the invention are 13-phosphatricyclo[7.3.1.0$^{5,13}$]tridecane (I–A); 13-phosphatricyclo[6.4.1.0$^{4,13}$]tridecane (I–B); 1,5,9 - trimethyl - 13-phosphatricyclo[7.3.1.0$^{5,13}$]tridecane; 1,5,9 - trimethyl-13-phosphatricyclo[6.4.1.0$^{4,13}$]tridecane; 3,7,11 - trimethyl-13-phosphatricyclo[7.3.1.0$^{5,13}$]tridecane; and 3,7,11-trimethyl-13-phosphatricyclo[6.4.1.0$^{4,13}$]tridecane.

Example 1

A 1-liter stainless-steel autoclave was charged with 243 g. (1.5 moles) of 1,5,9-cyclododecatriene (90% trans, trans,trans-isomer; 10% trans,trans,cis-isomer). The vessel was closed, purged with nitrogen, cooled in acetone-Dry Ice mixture and evacuated. Then 60 g. (1.76 moles) of phosphine was added from a weighed transfer bomb. The mixture was then stirred magnetically and irradiated in an 8000 curie cobalt-60 facility for 65 hours at 100° C. and 24 hours at 140° C. with a dose rate of 0.48 mrads/hr.

After being cooled to room temperature, unreacted phosphine was vented into a Bunsen flame and the vessel was thoroughly purged with nitrogen to displace dissolved phosphine. Gas liquid chromatographic (GLC) analysis (6-foot silicone rubber column, 225° C.) indicated a 53% conversion of cyclododecatriene to a mixture of PH$_3$-cyclododecatriene adducts of a 1:1 mole ratio. Distillation through a 6-inch Vigreaux column yielded three fractions:

|  | Amount, g. | Composition, mole percent |
|---|---|---|
| (1) B.P. 63–76° C. at 0.15–0.25 mm. | 63.5 | 86% triene, 14% 1:1 adducts. |
| (2) B.P. 80–97° C. at 0.15 mm. | 89.6 | 41% triene, 59% 1:1 adducts. |
| (3) B.P. 97–120° C. at 0.2–0.8 mm. | 57.0 | 94% 1:1 adducts, 6% higher boiling. |
| (4) Pot residue | 60 |  |

GLC analysis (6-foot silicone rubber column, 125° C.) indicated that the composition of unreacted triene (determined on crude reaction product) was 73% trans,trans, trans-isomer and 27% trans,trans,cis-isomer. GLC analysis (6-foot silicone rubber column, 225° C.) further indicated that the 1:1 phosphine-cyclododecatriene adducts were comprised of four components, two early eluting isomers and two later eluting isomers. These components were trapped and subjected to mass spectral and infrared analyses.

The infrared spectrum of the early eluting isomers exhibited significant absorptions at:

2275 cm.$^{-1}$—P—H stretch vibration
1668 cm.$^{-1}$—trans C=C stretch vibration
972 cm.$^{-1}$—trans CH=CH—CH out of plane deformation
702 cm.$^{-1}$—cis CH=CH—CH out of plane deformation The analyses indicated that the early eluting isomers are a mixture of cis- and trans-isomers of 1-cyclododeca-4,8-dienylphosphine, a primary phosphine precursor of the desired product.

The infrared spectra of the separated later eluting isomers showed no absorption at 2275 cm.$^{-1}$, or in the regions 1670, 970 or 700 cm.$^{-1}$, indicating absence of P—H or C=C bonds. The analyses indicated that the later eluting isomers are the desired products, 13-phosphatricyclo[6.4.1.0$^{4,13}$]tridecane and 13 - phosphatricyclo[7.3.1.0$^{5,13}$]tridecane (or perhydro-9$^b$-phosphaphenalene).

The primary phosphines were removed from the mixture of products by free-radical catalyzed reaction with 1-hexene. A 1-liter flask fitted with thermometer, condenser, serum cap and nitrogen inlet was purged with nitrogen and charged with 420 g. (5.0 moles of redistilled 1-hexene, 4.0 g. 0.024 mole) of azobisisobutyronitrile, and 146 g. of the above-mentioned fractions (1) and (2). A sample was removed and its infrared spectrum recorded with 1-hexene in the reference cell. The reaction mixture was blanketed with nitrogen and heated under gentle reflux in an oil bath at 80° C. After 22 hours a sample was withdrawn. The infrared spectrum showed complete dissappearance of P—H absorbence at 2280 cm.$^{-1}$. GLC analysis (6-foot silicone-rubber column, 225° C.) confirmed complete conversion of the P—H-containing components. Excess 1-hexene was removed and the reaction product distilled through a 6-inch Vigreaux column to give the following fractions:

|  | Amount, g. | Composition |
|---|---|---|
| (1) B.P. 84–93° C. at 0.2 mm. | 31.8 | Mainly cyclododecatriene. |
| (2) B.P. 93–112° C. at 0.2 mm. | 31.4 | Approx. 50% triene +50% tricyclic phosphine. |
| (3) B.P. 112–127° C. at 0.2 mm. | 53.2 | Principally tricyclic phosphine. |
| (4) B.P. 127–154° C. at 0.2 mm. | 7.4 | Intermediate. |
| (5) B.P. 154–197° C. at 0.2 mm. | 43.3 | Primary phosphine-hexene reaction product. |
| (6) Pot residue | 10.0 |  |

Fractions (2) and (3) were combined and redistilled through a 2-foot spinnnig band column yielding 58.9 g. of a center fraction, B.P. 73–77° C. at 0.07 mm., of a mixture of 13-phosphatricyclo[6.4.1.0$^{4,13}$]tridecane and 13-phosphatricyclo[7.3.1.0$^{5,13}$]tridecane.

*Analysis.*—Calculated for $C_{12}H_{21}P$: C, 73.4; H, 10.8; P, 15.8; basicity, 0.51 eq./100 g. Found: C, 73,5; H, 10.9; P, 14.9; basicity, 0.49 eq./100 g.

GLC analysis showed the presence of the above isomers in ratio 1:1.95 in order of elution; overall purity was 95%.

One gram of a mixture of 13-phosphatricyclo-[6.4.1.0$^{4,13}$]tridecane and 13-phosphatricyclo[7.3.1.0$^{5,13}$]tridecane was heated under reflux for two hours under a nitrogen blanket with 0.2 g. of sulfur in 25 ml. of benzene. Removal of the benzene followed by two crystallizations from n-hexane yielded crystalline rods of mixed 13-phosphatricyclotridecane sulfides, M.P. 177–178° C.

*Analysis.*—Calculated for $C_{12}H_{21}PS$: C, 63.1; H, 9.3; P, 13.6; S, 14.0. Found: C, 63.5; H, 9.2; P, 13.8; S, 13.7. Mass spectrum showed strong parent ion M$^+$ at m./q.=228, corresponding to $C_{12}H_{21}PS$.

The mixture of 13-phosphatricyclo[6.4.1.0$^{4,13}$]tridecane and 13-phosphatricyclo[7.3.1.0$^{5,13}$]tridecane reacted vigorously with an excess of methyl iodide, the resulting quaternary phosphonium halide separating almost immediately. Crystallization from ethyl acetate-methanol (20:1) yielded lustrous plates, M.P. >300° C.

*Analysis.*—Calculated for $C_{13}H_{24}IP$: C, 46.2; H, 7.2; P, 9.2. Found: C, 46.5; H, 7.2; P, 9.2.

Redistillation of fraction (5) yielded 41 g. of cyclo-dodecyldi(n-hexyl)phosphine, B.P. 165–185° C. at 0.1 mm.

Example 2

Trans,trans,cis-1,5,9-cyclododecatriene (99%) was also reacted with phosphine following the method of Example 1. The results of Examples 1 and 2 are summarized in Table I.

TABLE I

| Triene | PH$_3$/triene, mole ratio | Temp., °C. | Percent conversion of triene to— 1:1 Adducts | Percent conversion of triene to— A and B | Ratio B/A |
|---|---|---|---|---|---|
| Trans,trans,cis-isomer, 99% | 1.10 | 100–125 | 36 | 18 | 0.54 |
| Trans,trans,trans-isomer, 90%; trans,trans,cis-isomer, 10% | 1.17 | 100–140 | 53 | 38 | 1.24 |

A=13-phosphatricyclo[7.3.1.0$^{5,13}$]tridecane; B=13-phosphatricyclo[6.4.1.0$^{4,13}$]tridecane.

UTILITY

The novel tricyclic heterocyclic tert-phosphines of this invention are useful as phosphine ligands for organometallic complex catalysts. For example, in the hydroformylation of olefins to aldehydes and/or alcohols the cobalt and rhodium carbonyl heterocyclic phosphine complexes are excellent catalysts. The heterocyclic tert-phosphines of the invention are also useful in that they may be converted by treatment (a) with oxygen to the corresponding tricyclic heterocyclic tert-phosphine oxides, surfactants, and (b) with alkyl halide, such as methyl chloride, to the corresponding quaternary phosphonium halide, e.g. 13-methyl-13-phosphoniatricyclotridecane chlorides, which are useful as surfactants. A small amount of 13 - methyl - 13 - phosphoniatricyclotridecane iodide (the methiodide of Example 1) in water solution, for example 0.1 weight percent thereof in water, gave a substantial reduction of the interfacial (surface) tension.

Examples 3 and 4

Catalysts of cobalt in complex combination with carbon monoxide and the below-indicated tricyclic tert-phosphine ligands were utilized to hydroformylate 1-dodecene. The catalysts were prepared in situ, in the equipment to be described, from cobalt octanoate, CO, H$_2$ and the phosphine.

The reactor was a 300-ml. stainless steel magnetically stirred autoclave operated at 1250 r.p.m. and connected to a source of a premixed hydrogen-carbon monoxide gas delivered at any desired constant pressure. The components forming the catalyst (e.g., tert-phosphine and cobalt octanoate) and the olefin, 1-dodecene, were charged to the reactor; the reactor was closed, evacuated, and pressured with H$_2$-CO gas until all foreign gases were displaced. The reactor was then heated under sufficient H$_2$+CO pressure so that the final pressure at reaction temperature was about 1200 p.s.i.g. After the temperature was equilibrated, the pressure reduction was recorded. The reaction conditions and results are tabulated in Table II.

The results demonstrate that when the phosphine ligand was a mixture of 13-phosphatricyclo[7.3.1.0$^{5,13}$]tridecane and 13-phosphatricyclo[6.4.1.0$^{4,13}$]tridecane in mole ratio of 3:1, there was obtained a conversion of the olefin of 99.9% with a selectivity to $C_{13}$ alcohols of 80.0%. Of the $C_{13}$ alcohols obtained, 83.2% was the linear, straight-chain n-tridecanol, the remainder branched-chain alcohols. When the phosphine ligand was a mixture of 13-phosphatricyclo[6.4.1.0$^{4,13}$]tridecane and 13-phosphatricyclo[7.3.1.0$^{5,13}$]tridecane in mole ratio of 1:2, there was obtained a conversion of the olefin of 98.9% with a selectivity to $C_{13}$ alcohols of 81.9%. Of the $C_{13}$ alcohols obtained, 84.0% was the linear, straight-chain n-tridecanol, the remainder branched-chain alcohols.

TABLE II.—HYDROFORMYLATION OF 1-DODECENE

| | Example | |
|---|---|---|
| | 3 | 4 |
| Phosphine ligand | Mixture of A and B in mole ratio of A:B=3:1 | Mixture of B and A in mole ratio of B:A=1:2 |
| Cobalt, percent wt | 0.2 | 0.2 |
| Phosphine/cobalt mole ratio | 3 | 3 |
| KOH/cobalt mole ratio | 0.75 | 0.75 |
| H$_2$/CO mole ratio | 2.1 | 2.1 |
| Temperature, °C | 183–185 | 185 |
| Pressure, p.s.i.g | 1,200 | 1,200 |
| Time required for 50% conversion, hr | 4.2 | 1.6 |
| Conversion of 1-dodecene, percent | 99.9 | 98.9 |
| Conversion to saturated hydrocarbon, percent | 16.7 | 17.0 |
| Conversion to primary alkanols, percent | 80.0 | 81.9 |

A=13-phosphatricyclo[7.3.1.0$^{5,13}$]tridecane; B=13-phosphatricyclo[6.4.1.0$^{4,13}$]tridecane.

I claim as my invention:

1. 13-monophosphatricyclotridecanes, having 12 to 15 carbon atoms, 12 carbon atoms thereof together with the phosphorus atom being members of the tricyclic skeletal structure, in which the smallest phosphorus-containing ring contains at least 5 atoms and the phosphorus atom therein is a member of each of the three rings.

2. 13 - monophosphatricyclotridecanes according to claim 1 wherein up to three ring carbons are substituted with methyl groups.

3. 13 - monophosphatricyclotridecanes according to claim 1 wherein the smallest phosphorus-containing ring contains 5 atoms, the other two rings containing 6 and 7 atoms respectively.

4. 13 - monophosphatricyclotridecanes according to claim 1 wherein the three phosphorus-containing rings each contain 6 atoms.

5. 13-phosphatricyclo[7.3.1.0$^{5,13}$]tridecane.

6. 13-phosphatricyclo[6.4.1.0$^{4,13}$]tridecane.

7. The process of producing tricyclic heterocyclic tert-phosphines by reacting in substantially equimolecular amounts 1,5,9-cyclododecatrienes with phosphine (PH$_3$) under free radical-generating conditions and in the absence of substantial amounts of oxygen.

8. The process according to claim 7 in which the reaction is conducted in the presence of a saturated, liquid hydrocarbon.

9. The process according to claim 7 in which the cyclododecatriene is a mixture of trans,trans,cis-1,5,9-cyclododecatriene and trans,trans,trans-1,5,9-cyclododecatriene.

10. The process according to claim 7 in which the free radical-generating conditions are obtained by a dose rate of $1 \times 10^3$ to $1 \times 10^7$ rads./hr. of ionizing radiation in the form of electromagnetic radiation with incident photon energy of from $1 \times 10^4$ to $1 \times 10^7$ electron-volts.

References Cited

UNITED STATES PATENTS

| | | | |
|---|---|---|---|
| 2,584,112 | 2/1952 | Brown | 260—606.5 |
| 3,085,112 | 4/1963 | Brown | 260—606.5 |
| 3,287,415 | 11/1966 | Koster | 260—606.5 |
| 3,293,277 | 12/1966 | Convery | 260—606.5 X |

TOBIAS E. LEVOW, *Primary Examiner.*

W. F. W. BELLAMY, *Assistant Examiner.*

U.S. Cl. X.R.

204—158; 252—431, 437; 260—429, 439